(12) United States Patent
Taylor, III

(10) Patent No.: US 8,628,659 B1
(45) Date of Patent: *Jan. 14, 2014

(54) IN-SITU CONTAMINANT REMEDIATION SYSTEMS AND METHODS

(71) Applicant: Jesse Clinton Taylor, III, Loveland, CO (US)

(72) Inventor: Jesse Clinton Taylor, III, Loveland, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,948

(22) Filed: Feb. 15, 2013

Related U.S. Application Data

(63) Continuation of application No. 13/679,903, filed on Nov. 16, 2012, now Pat. No. 8,480,903.

(51) Int. Cl.
```
C02F 9/04      (2006.01)
C02F 9/14      (2006.01)
B09C 1/08      (2006.01)
B09C 1/10      (2006.01)
C02F 9/00      (2006.01)
C02F 3/02      (2006.01)
C02F 1/28      (2006.01)
C02F 1/72      (2006.01)
B09C 1/00      (2006.01)
C02F 3/00      (2006.01)
C02F 101/32    (2006.01)
C02F 103/06    (2006.01)
```

(52) U.S. Cl.
CPC ... *C02F 9/00* (2013.01); *C02F 3/02* (2013.01); *C02F 1/283* (2013.01); *C02F 1/722* (2013.01); *C02F 2003/003* (2013.01); *C02F 2101/322* (2013.01); *C02F 2101/327* (2013.01); *C02F 2103/06* (2013.01); *B09C 1/002* (2013.01); *B09C 1/08* (2013.01); *B09C 1/10* (2013.01); *B09C 2101/00* (2013.01)

USPC ............... 210/170.07; 210/198.1; 210/209; 405/128.45; 405/128.5; 405/129.25; 252/186.21; 252/186.23

(58) Field of Classification Search
USPC ......... 210/610, 616, 617, 631, 690, 691, 694, 210/747.7, 747.8, 758, 759, 170.07, 198.1, 210/209; 405/128.45, 128.5, 128.7, 128.75, 405/129.2, 129.25; 252/186.21, 186.43

See application file for complete search history.

(56) References Cited

U.S. PATENT DOCUMENTS

| | | | |
|---|---|---|---|
| 4,024,076 A | | 5/1977 | Miyake et al. |
| 4,201,831 A | | 5/1980 | Slusarczuk et al. |
| 4,499,208 A | | 2/1985 | Fuderer |
| 4,500,327 A | | 2/1985 | Nishino et al. |
| 4,591,443 A | * | 5/1986 | Brown et al. ............ 210/747.8 |

(Continued)

FOREIGN PATENT DOCUMENTS

WO   2004007379 A1   1/2004

OTHER PUBLICATIONS

U.S. Appl. No. 13/679,903, filed Nov. 16, 2012.

(Continued)

*Primary Examiner* — Christopher Upton
(74) *Attorney, Agent, or Firm* — Santangelo Law Offices, P.C.

(57) ABSTRACT

The present invention provides systems and methods for in-situ remediation of soil and groundwater having contaminants such as but not limited to organic compounds perhaps providing adsorption, chemical oxidation, and even biodegradation of contaminants with novel treatments such as but not limited to mixtures of granular activated carbon, calcium peroxide, sodium persulfate, and nitrate perhaps in various concentrations.

30 Claims, 2 Drawing Sheets

(56) References Cited

U.S. PATENT DOCUMENTS

| | | | | |
|---|---|---|---|---|
| 4,857,243 | A | 8/1989 | Von Blucher et al. | |
| 5,006,250 | A * | 4/1991 | Roberts et al. | 210/631 |
| 5,141,913 | A | 8/1992 | Vanlautem | |
| 5,221,159 | A | 6/1993 | Billings et al. | |
| 5,242,879 | A | 9/1993 | Abe et al. | |
| 5,271,693 | A | 12/1993 | Johnson et al. | |
| 5,277,518 | A | 1/1994 | Billings et al. | |
| 5,472,294 | A | 12/1995 | Billings et al. | |
| 5,486,292 | A | 1/1996 | Bair et al. | |
| 5,611,402 | A | 3/1997 | Welsh | |
| 5,653,288 | A | 8/1997 | Billings et al. | |
| 5,733,067 | A | 3/1998 | Hunt et al. | |
| 5,750,036 | A | 5/1998 | Sivavec | |
| 5,997,829 | A | 12/1999 | Sekine et al. | |
| 6,248,690 | B1 | 6/2001 | McKedy | |
| 6,423,533 | B1 | 7/2002 | Gearheart et al. | |
| 6,432,693 | B1 | 8/2002 | Hince | |
| 6,436,872 | B2 | 8/2002 | McKedy | |
| 6,663,781 | B1 | 12/2003 | Huling et al. | |
| 6,787,034 | B2 | 9/2004 | Noland et al. | |
| 6,834,720 | B1 | 12/2004 | Dwyer et al. | |
| 7,160,483 | B1 | 1/2007 | Hince | |
| 7,335,246 | B2 | 2/2008 | Huling et al. | |
| 7,335,307 | B2 | 2/2008 | Scheckel et al. | |
| 7,585,132 | B2 * | 9/2009 | Imbrie | 210/747.7 |
| 7,645,606 | B2 | 1/2010 | Priester, III et al. | |
| 7,662,294 | B1 * | 2/2010 | Cox, Jr. | 210/759 |
| 7,992,639 | B2 | 8/2011 | Fallon | |
| 8,097,559 | B2 | 1/2012 | Noland et al. | |
| 8,480,903 | B1 | 7/2013 | Taylor, III | |
| 2009/0090677 | A1 * | 4/2009 | Chen et al. | 210/747 |
| 2010/0059454 | A1 * | 3/2010 | Kabir et al. | 210/170.07 |
| 2010/0227381 | A1 * | 9/2010 | Hoag et al. | 210/610 |
| 2012/0114852 | A1 | 5/2012 | Noland et al. | |

OTHER PUBLICATIONS

U.S. Appl. No. 13/679,903, filed Nov. 16, 2012; Notice of Allowance dated Aug. 15, 2013.

* cited by examiner

IN-SITU CONTAMINANT REMEDIATION SYSTEMS AND METHODS

This application is a continuation of U.S. application Ser. No. 13/679,903 filed Nov. 16, 2012, hereby incorporated herein by reference.

BACKGROUND OF THE INVENTION

The present inventive technology, in embodiments, includes effective and efficient methods and systems relating to in-situ contaminant remediation. Specifically, the present invention may provide in-situ injection technologies for chemical oxidation/reduction materials, bioremediation, biostimulation, or the like of contaminants in groundwater, soil, or the like. Injection products and methods may combine commercial compounds to create a synergy that may make a resulting mixture that is cost effective with desirable results.

In the past, engineered microbes may have been used in some remediation techniques. However, engineered microbes may not survive in conventional bioremediation systems perhaps even after less than about a month and even in ideal conditions. Once the engineered microbes die off, they then need to be replaced perhaps several times, which may affect time, cost, and even efficiency. Other conventional systems include the bioremediation of contaminated soil using inoculated support spheres as discussed in U.S. Pat. No. 5,733,067 to Hunt hereby incorporated by reference herein. Past systems may not encompass the various advantages and other combinations of features as provided in the present invention herein.

SUMMARY OF THE INVENTION

The present invention may provide an environmental remediation system which may clean up contaminants in ground and even soil in-situ environments. It is an object of the certain embodiments of the present invention to provide a carbon based compound with perhaps multiple chemically oxygenating compounds and nutrients as a contaminant remediation treatment.

It is another object of the present invention to provide a remediation system which may be less than half the cost of conventional technologies such as but not limited to past carbon based compounds technologies.

It is an object of the present invention to provide a remediation system to remediate organic contaminants.

It is yet another object of the present invention to provide granular activated carbon as part of a mixture for remediation of contaminants such as organic contaminants or the like.

It is another object of the present invention to provide a mixture that may be effective at adsorption, chemical oxidation, and subsequent biodegradation of organic compounds.

Naturally, further objects, goals and embodiments of the inventions are disclosed throughout other areas of the specification and drawings.

DETAILED DESCRIPTION OF PREFERRED EMBODIMENTS

Figure 1:
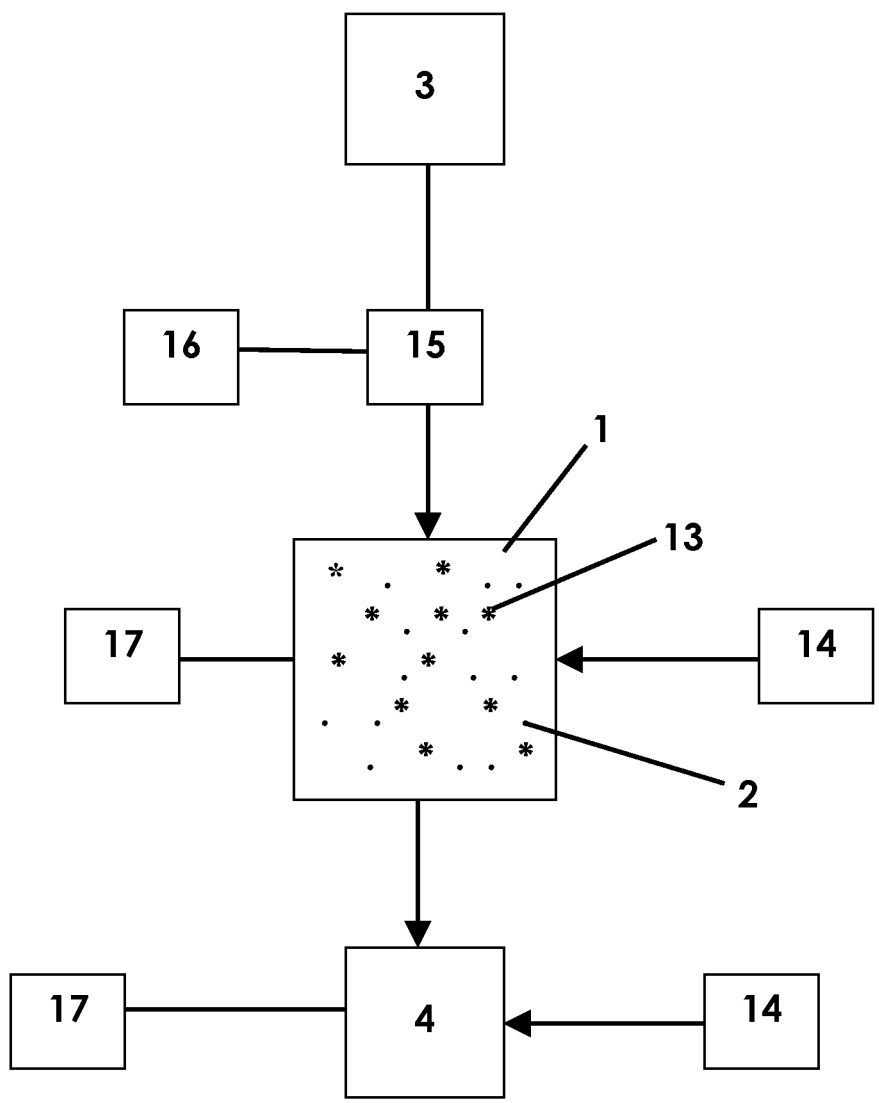
FIG. 1 shows an example of a schematic diagram of an in-situ soil and groundwater remediation system.

The present inventive technology includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all ratios, various permutations and combinations of all elements in this or any subsequent application.

The present invention may provide in-situ remediation of contaminated soil and groundwater systems and methods. In embodiments, a mixture may be used to treat contaminated environments perhaps using granular activated carbon which may adsorb a wide range of contaminants such as but not limited to hydrocarbons perhaps even after it may be introduced into an in-situ ground site that has at least some contaminants. For example, a mixture may be introduced into a subsurface in a slurry form as discussed herein. A carbon based treatment may include materials that may chemically oxidize contaminants such as but not limited to hydrocarbons perhaps even while creating a comfortable habitat for existing (e.g., BTEX) degrading bacteria, perhaps in regards to dissolved oxygen ("DO"), pH, or other factors. Mixtures of the present invention may be approximately half the price of conventional available carbon based compounds on the market today. It may have been expected that the activated carbon could absorb some or all of the oxidizers of the mixture; surprisingly, it does not. As indicated by over 20 bench scale treatment tests using example mixtures of the present invention, activated carbon in these mixtures have not absorbed oxidizers. Oxidizers of the mixture may be included to treat the contaminants.

In embodiments, a specific mixture of compounds may be provided to remediate contaminated soil and groundwater sites and may include but is not limited to: a method of in-situ remediation of soil and groundwater comprising the steps of providing an in-situ ground site having at least some contaminants; adding a mixture of granular activated carbon, calcium peroxide, sodium persulfate, and nitrate to the in-situ ground site; and perhaps even degrading the contaminants in the in-situ ground site with the mixture. Other embodiments may provide an in-situ soil and groundwater remediation system comprising an in-situ ground contaminant treating mixture comprising granular activated carbon; calcium peroxide; sodium persulfate; and perhaps even nitrates; wherein the in-situ ground contaminant treating mixture is configured to remediate an in-situ ground site having at least some contaminants. A mixture may also include phosphate, sodium sulfate, or the like, in any combination, perhaps with granular activated carbon, calcium peroxide, sodium persulfate, and nitrate. In embodiments, granular activated carbon may be powdered granular activated carbon and nitrate may be calcium nitrate.

Granular activated carbon may be a used as an adsorbent of organic compounds. However, the use of granular activated carbon alone may allow these compounds to remain present in the material. Once the granular activated carbon has reached its adsorptive capacity, the material may need to be removed and perhaps reactivated. This may be costly or even impossible when used in a subsurface for remedial purposes. Accordingly, embodiments of the present invention have developed mixtures that include granular activated carbon with other beneficial ingredients to address these and other issues. The various products and methods of the present invention are novel and unique such as by combining granular activated carbon with calcium peroxide and even sodium persulfate which may be used as oxidizers and perhaps even oxygen release compounds (OxRC). Since adsorbed organic matter may be degraded in place with these systems and methods, then removal and perhaps even reactivation requirements can be eliminated.

Contaminants may include but are not limited to organic compounds, hydrocarbons, aromatic hydrocarbons, polycyclic hydrocarbons, alkanes, alkenes, long-chain hydrocarbons, chlorinated solvents, volatile organic compounds (VOCs), semi-volatile organic compounds (SVOCs), benzene, toluene, ethylbenzene, xylenes, any combination thereof, or the like. Contaminants such as organic compounds may be dissolved in groundwater, adsorbed in the soil, in a vapor phase, any combination thereof, or the like in the in-situ ground site. Mixtures of the present invention may have proven effective on contaminants such as but not limited to BTEX compounds (e.g., benzene, toluene, ethylbenzene, xylenes), chlorinated compounds or the like.

For example, the present invention may provide in embodiments, a mixture that may be designed to be injected into a subsurface at sites in which unwanted organic compounds may be present in the groundwater in a dissolved phase and perhaps even in soils as adsorbed or vapor phase. As mentioned, affected organic compounds include, but are not limited to aromatic hydrocarbons, polycyclicic hydrocarbons, alkanes, alkenes, long-chain hydrocarbons, chlorinated solvents, volatile organic compounds (VOCs), semi-volatile organic compounds (SVOCs), or the like.

Chemical oxidation typically creates aerobic conditions for oxidation and may support aerobic bacteria. As mentioned above, a mixture may provide adsorption of the contaminants, chemical oxidation, and perhaps subsequent biodegradation of organic compounds. An in-situ ground site may be a subsurface, in-situ water, in-situ soil, substantially in-situ water, substantially in-situ soil, any combination thereof, or the like. Each contaminated ground site may be different in how much soil or water or combinations thereof may be present. Since each contaminated site may vary, a site-specific mixture may need to be developed on a site by site basis thus providing a variable concentration of a mixture dependent on the type of in-situ ground site perhaps in that each component of a mixture may be dependent on the type of in-situ ground site. The variable concentrations may be based on permeability, pore volume, or the like of the in-situ ground site. However, a universal treatment may be used in other embodiments.

As but one non-limiting example, a mixture may have a ratio of granular activated carbon:sodium persulfate:calcium peroxide:sodium sulfate:calcium nitrate having about 75:about 15:about 5:about 3:about 2. Of course, this may vary as mentioned above and all ratios are meant to be included in this application.

As may be understood from FIG. 1, a mixture (3) may be introduced (15) into an in-situ ground site (1) which may have contaminants (2) and perhaps even pre-existing organic materials (13) therein. As further discussed herein, introduction (15) of a mixture (3) into a ground site (1) may include but is not limited to adding, injecting, mixing, stirring, spraying, any combination thereof, or the like via an introducer, adder, injector, mixture injector, slurry injector, borehole injector, mixer, excavation backfill-mixture mixer, mixture sprayer, mixture-soil mixer, any combination thereof, or the like. A mixture may treat the contaminated ground site for a period of time and, when completed, may provide a clean, remediated, un-contaminated site (4).

Figure 2:
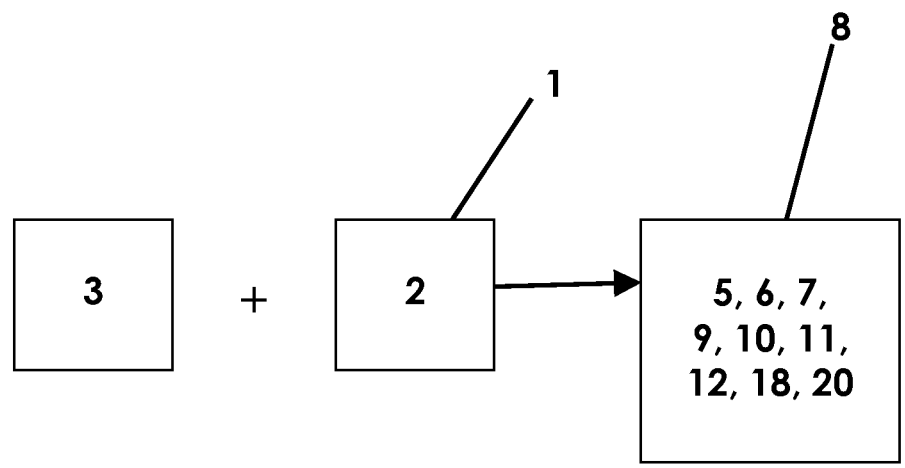
FIG. 2 shows an example of a schematic diagram of an environment that may be created when a mixture may be added to a contaminated in-situ ground site.

As may be understood from FIG. 2, when a mixture (3) may be combined with contaminants (2) in an in-situ ground site (1), an environment (8) may be created as a result of the mixture being added to the contaminants. Of course, it is noted that embodiments of the present invention may provide treatment of ex-situ contaminated materials and all discussion herein is meant to apply to ex-situ situations. An environment (8) may provide many different types of actions, reactions, or the like such as when combining a mixture with contaminants. For example, a mixture may include a contaminant adsorber (5) which may provide adsorbing of contaminates from an in-situ ground site on a mixture. Adsorbing could be with or even on part of the mixture or even by a mixture. Adsorbing may provide gathering of contaminants on a surface perhaps in a condensed layer. As a non-limiting example, granular activated carbon of a mixture may be a contaminant adsorber (5) in that it may provide adsorption of contaminants on the granular activated carbon. A mixture may include a chemical oxidizer (6) which may provide degrading of contaminants in an in-situ ground site. As a non-limiting example, calcium peroxide and perhaps even sodium persulfate maybe a chemical oxidizer (6) which may provide chemical oxidation.

When a mixture may be added to a contaminated site, it may allow biodegrading of the contaminants perhaps with an organic compound biodegradation element (7). A biodegradation element may stimulated by a mixture. A mixture may create an environment (8) which may support bacterial consumption in the in-situ ground site such that a mixture may be configured to create an environment to support bacterial consumption.

A mixture may be added to a contaminated ground site and may treat, perhaps without any additional mixture needed, the contaminated ground site for a period of time. A mixture may be mixed with water perhaps at various concentrations perhaps even depending on a permeability and/or pore volume of the impacted subsurface media. The chemical oxidation process may be an initial degrading process and that reaction can last from two weeks to two months. During this time, oxidation, or the removal of electrons from the carbon-carbon bonds present in organic molecules, may act on the sorbed organic chemicals. By products (9) (e.g., daughter products) of the breakdown may be produced and may include but are not limited to water, carbon dioxide, hydrogen, any combination thereof, or the like and perhaps even other compounds attached to the carbon molecules. For example, the present invention may provide, in embodiments, continuing chemical oxidation in an in-situ ground site for a reaction time such as but not limited to up to about 2 weeks, up to about 2 months, between about 2 weeks and about 2 months, up to about 3 months, or the like. Of course, any amount of time may be needed for the reaction(s) or even to complete the reaction(s) and even remediation and all are meant to be included in this application.

Chemical oxidation may be a well-known process; and in the past, it has been avoided to combine chemical oxidation with carbon due to an apparent diversion of degradation activities from the contaminant to the added carbon itself. Surprisingly, embodiments of the present invention provide novel mixtures in that test results have indicated that this combination of compounds minimize this diversion.

A material may be mixed so that the surrounding groundwater and adsorbed water molecules may be infused with a high dissolved oxygen content (DO) (10), neutral pH (11) and perhaps even an elevated component (12) such as but not limited to an elevated sulfate, elevated nitrate, elevated phosphate or the like. The presence of organic materials in a subsurface may support bacteria that may use the mixture as a source of energy. Accordingly, a mixture may include materials added to granular activated carbon which may provide a high dissolved oxygen content, nutrients, and perhaps even a neutral pH which may stimulate a population bloom (20) or even population growth of the naturally occurring aerobic bacteria. Therefore, the present invention may provide a high dissolved oxygen content, an elevated component, or even a neutral pH in an in-situ ground site as a result of adding a mixture to the in-situ ground site. A high dissolved oxygen content may be between about 15 mg/L to about 40 mg/L of dissolved phase oxygen. Typically, bacteria in a hydrocarbon plume can reduce dissolved phase oxygen to below about 0.75 milligrams/Liter (mg/L). Embodiments of the present invention may provide mixtures that may raise that range to between about 15 mg/L to about 40 mg/L.

In embodiments, the present invention may provide a biostimulation (14) to an in-situ ground site. This may include adding a bio-stimulation during remediation or even near an end of contaminant remediation of an in-situ ground site. Bio-stimulation may include an oxygen release compound (e.g., Regenesis ORC), hydrogen peroxide, calcium peroxide (e.g. perhaps alone), oxygen or even air injection. It is noted that bio-stimulation may not include bio-augmentation where engineered bacteria may be added. In other embodiments, the present invention may provide a rebound preventer (18) which may prevent rebound in an in-situ ground site. Due to the way a mixture may be designed, it may adsorb (e.g., trap) and then degrade (e.g., treat) the contaminants at the site. A mixture may be added to the water and/or the soil so that it can all be treated, perhaps substantially treated, so as to prevent contaminants from the soil to enter into the water.

A cost differential between remedial materials may often be a significant factor in the overall costs of a proposed injection project. The present invention may provide an economic comparison of remedial materials. Thus, data from a bench scale test may be taken and may subject results to a cost model that may take these differences into account perhaps as well as the known injection costs. A final cost factor may be calculated to determine the most cost effective material used in the test. See Tables 1 and 2 which provide a comparison between T-4, which uses an example mixture of the present invention, as compared to commercially available compounds (T-1, T-2, T-3, T-5, T-6, T-7, T-8, and T-9). T10 is a method blank.

TABLE 1

Benzene

| | BEFORE (ug/L) | AFTER (ug/L) | REDUCTION | % REDUCTION | CORRECTED % REDUCTION |
|---|---|---|---|---|---|
| T-1 | 1,220.0 | 530.00 | 690 | 56.6% | 41.4% |
| T-2 | 1,230.0 | 1,070.0 | 160 | 13.0% | -2.2% |
| T-3 | 1,310.0 | 925.0 | 385 | 29.4% | 14.2% |
| T-4 | 1,310.0 | 10.0 | 1,300 | 99.2% | 84.0% |
| T-5 | 1,330.0 | 796.0 | 534 | 40.2% | 25.0% |
| T-6 | 1,260.0 | 490.0 | 770 | 61.1% | 45.9% |
| T-7 | 1,390.0 | 691.0 | 699 | 50.3% | 35.1% |
| T-8 | 1,320.0 | 1,290.0 | 30 | 2.3% | -12.9% |
| T-9 | 1,430.0 | 1,240.0 | 190 | 13.3% | -1.9% |
| T-10 | 1,450.0 | 1,230.0 | 220 | 15.2% | 0.0% |

TABLE 2

Benzene

| | COST FACTOR | COST/ % REDUCTION | EVENTS/ 100% REDUCTION | L & E COST | FINAL COST FACTOR |
|---|---|---|---|---|---|
| T-1 | $6,384 | $154 | 2.42 | $5,000 | $27,549 |
| T-2 | $10,171 | -$4,640 | NA | $5,000 | NA |
| T-3 | $27,136 | $1,912 | 7.04 | $5,000 | $226,237 |
| T-4 | $12,600 | $150 | 1.20 | $5,000 | $21,120 |
| T-5 | $10,668 | $428 | 4.00 | $5,000 | $62,672 |
| T-6 | $7,850 | $171 | 2.17 | $5,000 | $27,885 |
| T-7 | $18,450 | $526 | 2.85 | $5,000 | $66,833 |
| T-8 | $11,600 | -$897 | NA | $5,000 | NA |
| T-9 | $31,420 | -$16,422 | NA | $5,000 | NA |

In some embodiments, a mixture such as granular remedial material may be introduced into a ground site in a slurry form. This may be accomplished by mixing the material in with excavation backfill, or perhaps even injection into a borehole. A slurry pump may be chemically resistant and may be designed for application with high maximum pressure and perhaps even a high flow rate. For example, granular activated carbon and calcium peroxide may be insoluble and as such it may be desirable to introduce (15) these materials in a mixture perhaps as injected as a slurry with perhaps a slurry injector as discussed herein.

A mixture or slurry may be sprayed into a ground site. For example, when adding a mixture to an excavation backfill, a slurry may be sprayed onto the soil and perhaps even stirred up or mixed with a bobcat, back-hoe, track-hoe, soil mixing, or the like. A mixture may then be placed in the excavation in such a way that it may come into contact with the groundwater and/or anticipated infiltration pathways. Of course, multiple methods are available for injection of mixtures such as remedial slurries into ground sites such as subsurfaces and all are meant to be used with the various embodiments of the present invention.

In some instances, a site may need to clear boreholes prior to ground disturbance activities. In borehole injection, a borehole can be filled with a material or higher pressures can be used to create artificial pathways (fracture) into which a mixture or slurry can be pushed away from the borehole into the surrounding soil. Clearing may be accomplished with a borehole clearer (16) which may include but is not limited to an air knife, a water knife, or the like. Air-knifing may be a non-intrusive way of removing soil from a borehole location to insure the absence of utilities, pipelines, tanks, or the like. Air-knifing may be desirable in that it may be a gentle way of dislodging material from the near surface without damaging underground utilities. Water knifing may be used as well.

As mentioned, bench scale testing may be conducted so that a ground site can be evaluated perhaps on a small scale. As such, the present invention may provide conducting bench scale testing (17) of an in-situ ground site with samples from the in-situ ground site. The samples may be pre-remediation samples, samples taken during remediation, post-remediation samples, or samples taken from any part of the ground site, perhaps even at any time, or the like.

As can be easily understood from the foregoing, the basic concepts of the present invention may be embodied in a variety of ways. It involves both remediation techniques as well as devices to accomplish the appropriate remediater. In this application, the remediation techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "adsorber" should be understood to encompass disclosure of the act of "adsorbing" —whether explicitly discussed or not—and, conversely, were there effectively disclosure of the act of "adsorbing", such a disclosure should be understood to encompass disclosure of a "adsorber" and even a "means for adsorbing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any information disclosure statement or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the remediation devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An in-situ soil and groundwater remediation system comprising:
    an in-situ ground contaminant treating mixture comprising:
        granular activated carbon;
        calcium peroxide;
        sodium persulfate; and
        nitrates.

2. An in-situ soil and groundwater remediation system according to claim 1 wherein said granular activated carbon comprises powdered granular activated carbon.

3. An in-situ soil and groundwater remediation system according to claim 1 and further comprising an in-situ ground site having at least some contaminants.

4. An in-situ soil and groundwater remediation system according to claim 3 wherein said in-situ contaminated ground site comprises a ground site selected from a group consisting of a subsurface, water, soil, substantially water, substantially soil, and any combination thereof.

5. An in-situ soil and groundwater remediation system according to claim 3 wherein said in-situ ground site comprises a remediating in-situ ground site where said in-situ ground contaminant treating mixture has been added to said in-situ ground site.

6. An in-situ soil and groundwater remediation system according to claim 5 and further comprising remediation by-products in said remediating in-situ ground site, said by-products selected from a group consisting of water, carbon dioxide ($CO_2$), hydrogen (H), and any combination thereof.

7. An in-situ soil and groundwater remediation system according to claim 5 wherein said remediating in-situ ground site comprises a high dissolved oxygen content.

8. An in-situ soil and groundwater remediation system according to claim 7 wherein said high dissolved oxygen content comprises between about 15 mg/L to about 40 mg/L of dissolved phase oxygen.

9. An in-situ soil and groundwater remediation system according to claim 5 wherein said remediating in-situ ground site comprises a neutral pH.

10. An in-situ soil and groundwater remediation system according to claim 5 wherein said remediating in-situ ground site comprises an elevated component content selected from a group consisting of an elevated sulfate content, an elevated nitrate content, an elevated phosphate content, and any combination thereof.

11. An in-situ soil and groundwater remediation system according to claim 5 wherein said remediating in-situ ground site comprises a population bloom of naturally occurring aerobic bacteria.

12. An in-situ soil and groundwater remediation system according to claim 3 wherein said in-situ ground site comprises pre-existing organic materials in said in-situ ground site.

13. An in-situ soil and groundwater remediation system according to claim 3 wherein said contaminants comprises organic compounds.

14. An in-situ soil and groundwater remediation system according to claim 13 wherein said organic compounds are selected from a group consisting of organic compounds dissolved in groundwater, organic compounds adsorbed in soil, organic compounds in vapor phase in soil, and any combination thereof.

15. An in-situ soil and groundwater remediation system according to claim 3 wherein said contaminants are selected from a group consisting of hydrocarbons, aromatic hydrocarbons, polycyclic hydrocarbons, alkanes, alkenes, long-chain hydrocarbons, chlorinated solvents, volatile organic compounds (VOCs), semi-volatile organic compounds (SVOCs), benzene, toluene, ethylbenzene, xylenes, and any combination thereof.

16. An in-situ soil and groundwater remediation system according to claim 3 wherein said mixture comprises variable concentrations dependent on the type of said in-situ ground site.

17. An in-situ soil and groundwater remediation system according to claim 16 wherein said variable concentrations are dependent on a factor selected from a group consisting of permeability and pore volume of said in-situ ground site.

18. An in-situ soil and groundwater remediation system according to claim 3 and further comprising a bench scale sample test configured to test samples of said in-situ ground site.

19. An in-situ soil and groundwater remediation system according to claim 18 wherein said samples are selected from a group consisting of pre-remediation samples, samples taken during remediation, and post-remediation samples.

20. An in-situ soil and groundwater remediation system according to claim 1 and further comprising a bio-stimulator.

21. An in-situ soil and groundwater remediation system according to claim 1 wherein said mixture comprises a ratio of granular activated carbon:sodium persulfate:calcium peroxide:sodium sulfate:calcium nitrate having about 75:about 15:about 5:about 3:about 2.

22. An in-situ soil and groundwater remediation system according to claim 1 wherein said nitrate comprises calcium nitrate.

23. An in-situ soil and groundwater remediation system according to claim 1 and further comprising a mixture injector.

24. An in-situ soil and groundwater remediation system according to claim 23 wherein said mixture injector comprises a slurry injector.

25. An in-situ soil and groundwater remediation system according to claim 23 wherein said mixture injector comprises a borehole injector.

26. An in-situ soil and groundwater remediation system according to claim 25 and further comprising a borehole clearer.

27. An in-situ soil and groundwater remediation system according to claim 1 and further comprising an excavation backfill-mixture mixer.

28. An in-situ soil and groundwater remediation system according to claim 1 and further comprising a mixture sprayer.

29. An in-situ soil and groundwater remediation system according to claim 1 wherein said mixture comprises a slurry.

30. An in-situ soil and groundwater remediation system according to claim 1 and further comprising a mixture-soil mixer.

* * * * *